US012692966B2

(12) United States Patent
Schulte

(10) Patent No.: US 12,692,966 B2
(45) Date of Patent: Jul. 28, 2026

(54) DEVICE FOR CONNECTING A WATER PIPE TO A COMPONENT HAVING A PASSAGE

(71) Applicant: Viega Technology GmbH & Co. KG, Attendorn (DE)

(72) Inventor: Philipp Schulte, Lennestadt (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 18/776,921

(22) Filed: Jul. 18, 2024

(65) Prior Publication Data

US 2025/0027590 A1    Jan. 23, 2025

(30) Foreign Application Priority Data

Jul. 19, 2023    (DE) .................... 10 2023 119 017.2

(51) Int. Cl.
F16L 41/14          (2006.01)
F16L 19/02          (2006.01)
F16L 19/025         (2006.01)

(52) U.S. Cl.
CPC ........... F16L 41/14 (2013.01); F16L 19/0237 (2013.01); F16L 19/025 (2013.01)

(58) Field of Classification Search
CPC ...... F16L 41/14; F16L 19/025; F16L 19/0237
See application file for complete search history.

(56) References Cited

U.S. PATENT DOCUMENTS

| | | | |
|---|---|---|---|
| 5,115,550 A | 5/1992 | Williamson | |
| 5,738,141 A | 4/1998 | Blanke et al. | |
| 11,732,452 B2 | 8/2023 | Hausmann et al. | |
| 2003/0178849 A1 | 9/2003 | Hayashi et al. | |
| 2010/0181393 A1 * | 7/2010 | Pitzer .................... | F16L 19/025 |
| 2018/0038525 A1 | 2/2018 | Kwast et al. | |
| 2018/0299042 A1 * | 10/2018 | Ishibashi ................ | F16L 41/14 |
| 2021/0180717 A1 | 6/2021 | Wu | |
| 2021/0317930 A1 | 10/2021 | Marc et al. | |
| 2023/0024126 A1 | 1/2023 | Harada et al. | |

FOREIGN PATENT DOCUMENTS

| | | | | |
|---|---|---|---|---|
| DE | 202011109992 U1 | 9/2012 | | |
| DE | 102015102877 A1 | 9/2016 | | |
| EP | 0731230 A2 | 9/1996 | | |
| EP | 1457727 A2 | 9/2004 | | |
| WO | WO-2015193164 A1 * | 12/2015 | ............ | F16L 19/025 |
| WO | 2020178062 A1 | 9/2020 | | |

* cited by examiner

*Primary Examiner* — Zachary T Dragicevich
(74) *Attorney, Agent, or Firm* — The Webb Law Firm

(57)          ABSTRACT

A device for connecting a water pipe to a component, including a connecting piece having a first end to be connected to the component, a second end to be connected to a water pipe, and an outwardly projecting stop. The first end includes an annular groove or socket for receiving a sealing ring. A sealing ring is arranged in the annular groove or the socket, and with a fastening element for fastening the connecting piece to the component, at least one projection engaging behind a stop defining a stop surface which interacts with a seating surface of the component when the connecting piece is fastened to the component, with the stop or the seating surface facing the stop including at least one recess or projection that interrupts annularly closed surface contact between the stop surface and the seating surface.

7 Claims, 10 Drawing Sheets

Fig.1b PRIOR ART

DEVICE FOR CONNECTING A WATER PIPE TO A COMPONENT HAVING A PASSAGE

CROSS-REFERENCE TO RELATED APPLICATION

This application claims priority to German Patent Application No. 10 2023 119 017.2 filed Jul. 19, 2023, the disclosure of which is hereby incorporated by reference in its entirety.

BACKGROUND OF THE INVENTION

Field of the Invention

The invention relates to a device for connecting a water pipe to a component having a passage, in particular to a fitting for changing and/or controlling a water flow, with a connecting piece having a passage channel for passing water in the direction of the component, wherein the connecting piece has a first end to be connected to the component, a second end to be connected to the water pipe and an outwardly projecting stop in the form of a collar or flange formed between the first end and the second end of the connecting piece, wherein the first end of the connecting piece is provided on its outer side with an annular groove or is formed as a socket (spout) for receiving a sealing ring, wherein a sealing ring is preferably arranged in the annular groove or on the socket (spout), and with a fastening element for fastening the connecting piece to the component, wherein at least one projection engaging behind the stop is formed on the fastening element, and wherein the stop defines a stop surface which interacts with a seating surface of the component when the connecting piece is fastened to the component by defining a position of the connecting piece relative to the component.

Description of Related Art

Numerous embodiments are known for connecting water pipes to components with a passage, in particular to fittings for changing and/or controlling a water flow, for example angle valves or single-lever mixer taps.

Faucet bodies of single-lever mixers for washbasins usually have connection holes with an internal thread into which a screw nipple arranged at the end of a flexible water pipe is screwed. Such a water pipe is typically designed as a so-called armored hose. The other end of the flexible water pipe is usually connected to an angle valve. For this purpose, the angle valve has a plug-in seat into which a plug-in nipple arranged at the end of the flexible water pipe is inserted. To attach (secure) the plug-in nipple to the angle valve, the plug-in seat is usually provided with an external thread onto which a union nut is screwed, which engages behind a stop on the plug-in nipple in the form of a flange or collar. To ensure that this connection is watertight, the plug-in nipple is provided with an O-ring or a flat ring seal on its outer side, whereby the O-ring is inserted into an annular groove formed in the outer surface of the plug-in nipple; in contrast, a flat ring seal lies against the stop surface of the stop designed as a flange or collar facing the plug-in seat.

Such connections of a flexible water pipe or connection devices for connecting a water pipe to a component with a passage, in particular with or on an angle valve or filling valve, are also known for WC cisterns (cf. e.g. EP 0 731 230 A2).

In a cistern known from WO 2020/178062 A1, the connection of an angle valve to an armored hose is designed as a plug-in seat connection with a union nut and O-ring in the cistern.

Such a connection can still be watertight if the O-ring is missing or damaged by firmly tightening the union nut, as the plug-in nipple, which is usually made of plastic, rests flat on the ring-shaped end face of the plug-in seat of the angle valve, which is usually made of brass, with its stop designed as a collar. However, it has become apparent that such a faulty connection is only watertight for a short time and not permanently. In the case of such faulty connections, especially if the connection is arranged inside a sanitary cistern, water can splash heavily and thus cause water damage at the end user.

SUMMARY OF THE INVENTION

On this basis, the invention is based on the object of improving a connection or device of the type mentioned at the beginning in such a way that the risk of leakage or water damage is reduced or largely prevented.

This object is solved by a device with the features specified herein.

To solve the object, the invention provides in a device of the type mentioned at the beginning that the stop or the seating surface of the component facing the stop has at least one recess or projection (elevation) by means of which an annularly closed surface contact between the stop surface of the stop and the seating surface of the component is interrupted or prevented.

The invention is based on the idea of making a leak in the device due to a damaged or missing sealing ring clearly perceptible, preferably visible, in every installation case when such a device is put into operation, so that, if necessary, the leak can be eliminated by inserting a faultless sealing ring and water damage can be prevented.

An advantageous embodiment of the invention is characterized in that the at least one recess is formed in the stop, wherein the recess is formed in the form of a gap which extends from an outer edge of the stop to a circumferential outer surface of the first end of the connecting piece or ends at a radial distance from this outer surface, wherein this outer surface defines a fillet with the stop, and wherein the radial distance, if any, is less than 3 mm, preferably less than 2 mm, particularly preferably less than 1 mm. Preferably, the at least one recess ends in the region of the annular gap delimited by the (first) end of the connecting piece to be connected to the component, for example a fitting for changing and/or controlling a water flow, and the seating surface of the component facing the stop of the connecting piece.

The at least one recess can be produced easily and inexpensively. For example, it can be formed during an injection molding process for manufacturing the connecting piece in its stop. Alternatively, the at least one recess in the stop can be created subsequently by removing material, e.g. by cutting or milling. The dimensions of the at least one recess can be variably selected or easily adapted to ensure that a leak caused by the absence of the sealing ring can be easily perceived.

The second end of the connection piece is preferably connected to a water pipe in the form of a hose, for example a so-called armored hose. Armored hoses are constructed from a plastic or rubber hose coated with stainless steel wire mesh, whereby the wire mesh serves as mechanical protection for the plastic or rubber hose.

The connecting piece of the device according to the invention is preferably made of plastic. However, it is also within the scope of the invention for the connecting piece to be made of metal, e.g. brass. The (second) end of the connecting piece to be connected to a water pipe preferably has a saw-tooth profile on its outer side. This (second) end of the connecting piece can also be referred to as a hose nozzle or hose nipple. The end of the water pipe, which is preferably designed as a hose, is secured to said end (hose nipple) of the connecting piece by means of a clamp or plastically deformable crimp sleeve, whereby the clamp or deformed crimp sleeve presses the attached end of the water pipe against the saw-tooth profile in a watertight manner.

According to a further embodiment of the device according to the invention, the end of the connecting piece to be connected to the water pipe has a radial projection axially spaced from the stop between the saw-tooth profile and the stop in the form of a collar or flange, which is engaged behind by the fastening element for fastening the connecting piece to the component having a passage or to the fitting. The projection serves as an axial stop for the water pipe (hose line) pushed onto the connection piece and/or as a positive locking element for axially fixing the plastically deformed crimp sleeve. The projection is preferably designed as a circumferential projection, for example in the form of a circumferential rib.

According to a further embodiment of the invention, the at least one gap preferably extends over the entire axial thickness of the stop. This makes it possible to achieve a short flow path (leakage path) for leakage water escaping towards the outside of the connected water pipe due to the missing or damaged sealing ring. A short, concentrated flow path of any escaping leakage water can increase or improve the intensity of the leakage, e.g. a water jet intensity, and thus the perceptibility, in particular visibility, of the leakage water escaping due to the missing or damaged sealing ring.

According to a further embodiment of the invention, the gap has a V-shaped or U-shaped cross-sectional profile and/or a flattened gap base. This design also contributes to good perceptibility of leakage water, which escapes when the sealing ring is missing or damaged.

A further or alternative embodiment of the invention is characterized in that the at least one projection (elevation) is formed on the stop side of the stop facing the component or the fitting. The at least one projection can be easily and inexpensively formed on the stop. For example, the at least one projection (elevation) can be formed on the stop during an injection molding process for manufacturing the connecting piece.

Alternatively, the projection can be created subsequently on the stop by material application, welding or bonding or plastic forming. The dimensions of the at least one projection (elevation) can be variably selected or easily adapted with regard to a desired good perceptibility of a leak caused by the absence of the sealing ring.

According to a further embodiment of the invention, the projection (elevation) is in the form of at least one rib or thickening. The thickening can, for example, be in the form of a cylindrical or tooth-shaped, in particular truncated cone, truncated pyramid or dome-shaped projection.

A further embodiment of the invention provides that the at least one projection (elevation) is elongated and extends radially on the stop. This also makes it possible to reliably achieve that an annularly closed surface contact between the stop of the connecting piece and the seat of the sanitary fitting is interrupted or prevented.

A further embodiment of the invention is characterized in that the at least one recess is formed in the stop, the recess being in the form of a through-hole which extends over the entire axial thickness of the stop. This design also makes it possible to achieve a short flow path (leakage path) for leakage water escaping towards the outside of the connected water pipe due to the missing or damaged sealing ring. A short, concentrated flow path of any escaping leakage water can increase or improve the intensity of the leakage, e.g. a water jet intensity, and thus the perceptibility of the leakage water. The at least one through hole can, for example, be designed as a bore.

A further embodiment of the device according to the invention provides that the at least one through hole is adjacent directly or at a distance to a circumferential outer surface of the first end of the connecting piece, wherein this outer surface defines with the stop a fillet lying aside from the through hole, and wherein the distance, if any, is less than 3 mm, preferably less than 2 mm, particularly preferably less than 1 mm. In this way, the through hole can be realized with sufficiently large or advantageous hole cross-section with compact dimensions of the device according to the invention. Preferably, the at least one through hole ends in the area of the annular gap which is defined by the (first) end of the connecting piece to be connected to the component or the fitting and a section of the component or the fitting surrounding this end.

According to a further or alternative embodiment of the invention, the at least one recess is formed in the seating surface of the component or fitting facing the stop, the recess being in the form of a groove which extends inwards from an outer circumference of the seating surface to an inner circumference of the seating surface. This design also makes it possible to reliably achieve that an annularly closed surface contact between the stop surface of the stop of the connecting piece and the seat surface of the component or the fitting is interrupted or prevented.

A further or alternative embodiment of the invention provides that the at least one projection (elevation) is formed on the seating surface side of the component or fitting facing the stop. The at least one projection can also be formed as a rib or thickening, for example in the form of a cylindrical or tooth-shaped, in particular truncated cone-, truncated pyramid- or dome-shaped projection on the seating surface side of the component or the fitting.

A further embodiment of the device according to the invention provides that the first end of the connecting piece is designed as a plug-in nipple. The plug-in nipple preferably has a circumferential chamfer on the outer circumference at its insertion end (front end). The receptacle of the component or fitting assigned to the plug-in nipple opens at the seating surface of the component or fitting facing the stop of the connecting piece, whereby the receptacle preferably has a circular cylindrical axial section (inner section) and an adjoining opening section that increases conically in the direction of the seating surface.

According to a further preferred embodiment of the device according to the invention, the fastening element for fastening the connecting piece to the component or the fitting is designed as a union nut. By means of a union nut, the connecting piece can be very reliably and conveniently fastened to a component or fitting of this type having a corresponding external thread and can be detached from the component or fitting as required, e.g. for repair or maintenance purposes.

Instead of a union nut, however, the device according to the invention can also have another fastening element for fastening the connecting piece to the component or fitting.

For example, the fastening element can alternatively be designed as a latching element, in particular as a locking element with latching hooks or latching projections. A connection of a water pipe to a component with a passage, in particular to a fitting that has a plug-in seat with such a latching element or securing element, is disclosed, for example, in EP 1 457 727 A2 or DE 20 2011 109 992 U1. The disclosure content of these documents is fully included in the disclosure of the present application.

The device according to the invention is intended in particular for a fitting for changing and/or controlling a water flow, which is, for example, a valve, preferably an angle valve or a filling valve for a cistern. The above-mentioned seating surface of the component or fitting is preferably formed on the end face of a plug-in seat (connection pipe socket) for receiving the connecting piece. Alternatively, such a component or fitting can also be part of the device according to the invention.

BRIEF DESCRIPTION OF THE DRAWINGS

The terms Fig., Figs., Figure, and Figures are used interchangeably in the specification to refer to the corresponding figures in the drawings.

The invention is explained in more detail below with reference to a drawing illustrating several embodiments.

FIG. 1b shows the component (angle valve) from FIG. 1 with the water pipe connected to it using the connecting piece and a sealing ring, in a partial axial sectional view;

DESCRIPTION OF THE INVENTION

Figure 1A:
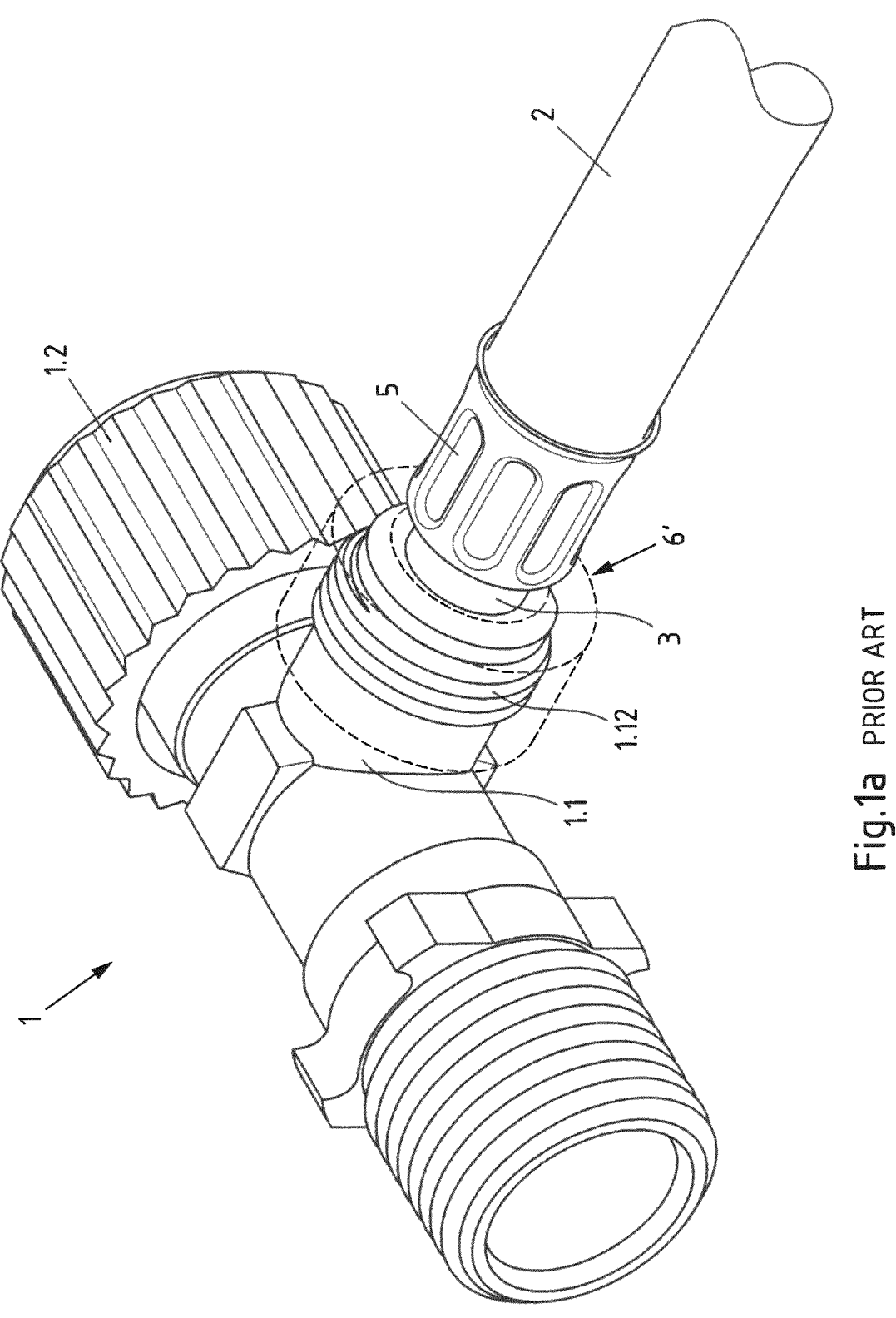
FIG. 1a shows a component in the form of an angle valve with a water pipe connected to it using a connecting piece according to the prior art, in a perspective view.
Figure 1B:
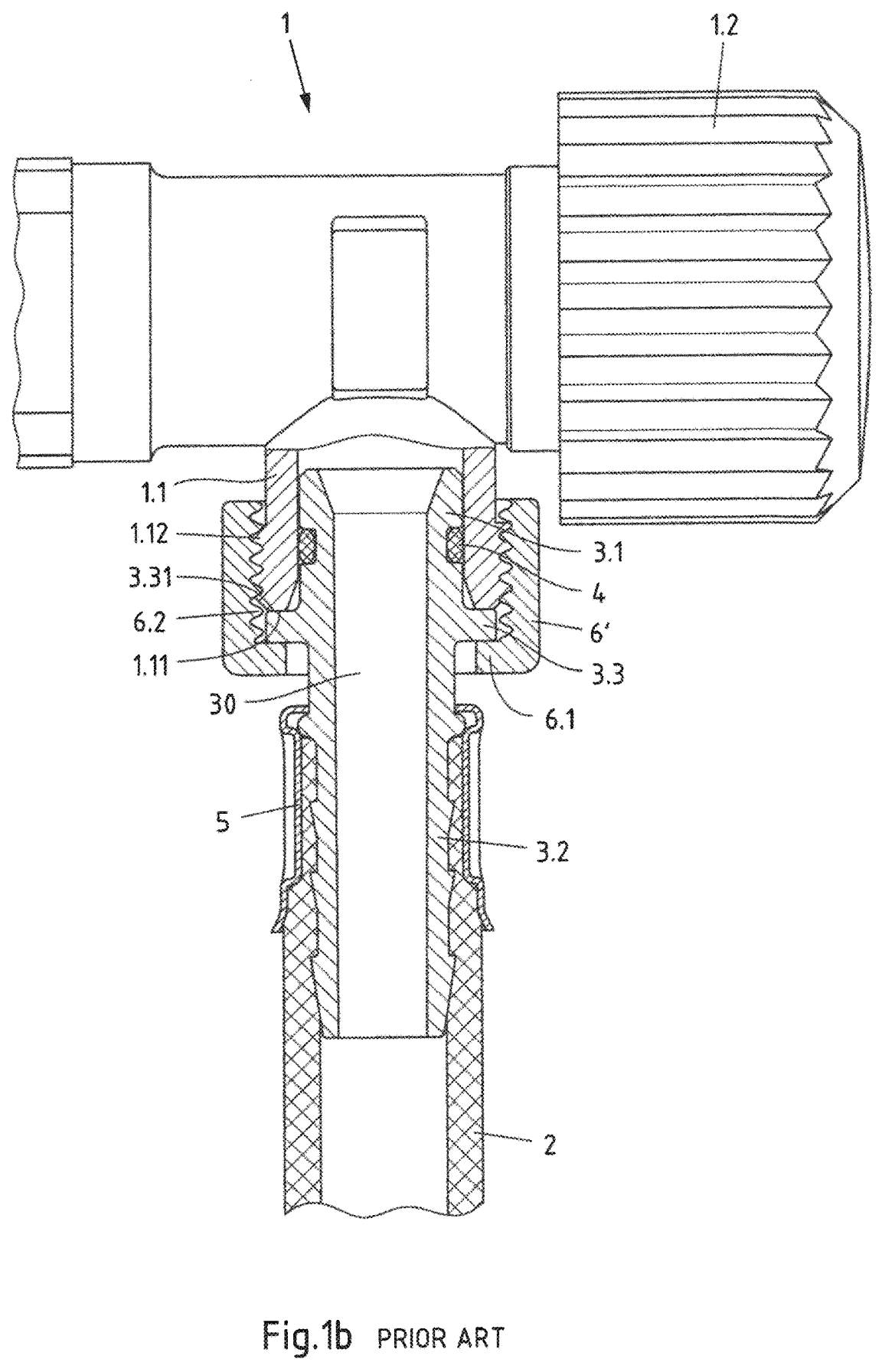
Figure 1C:
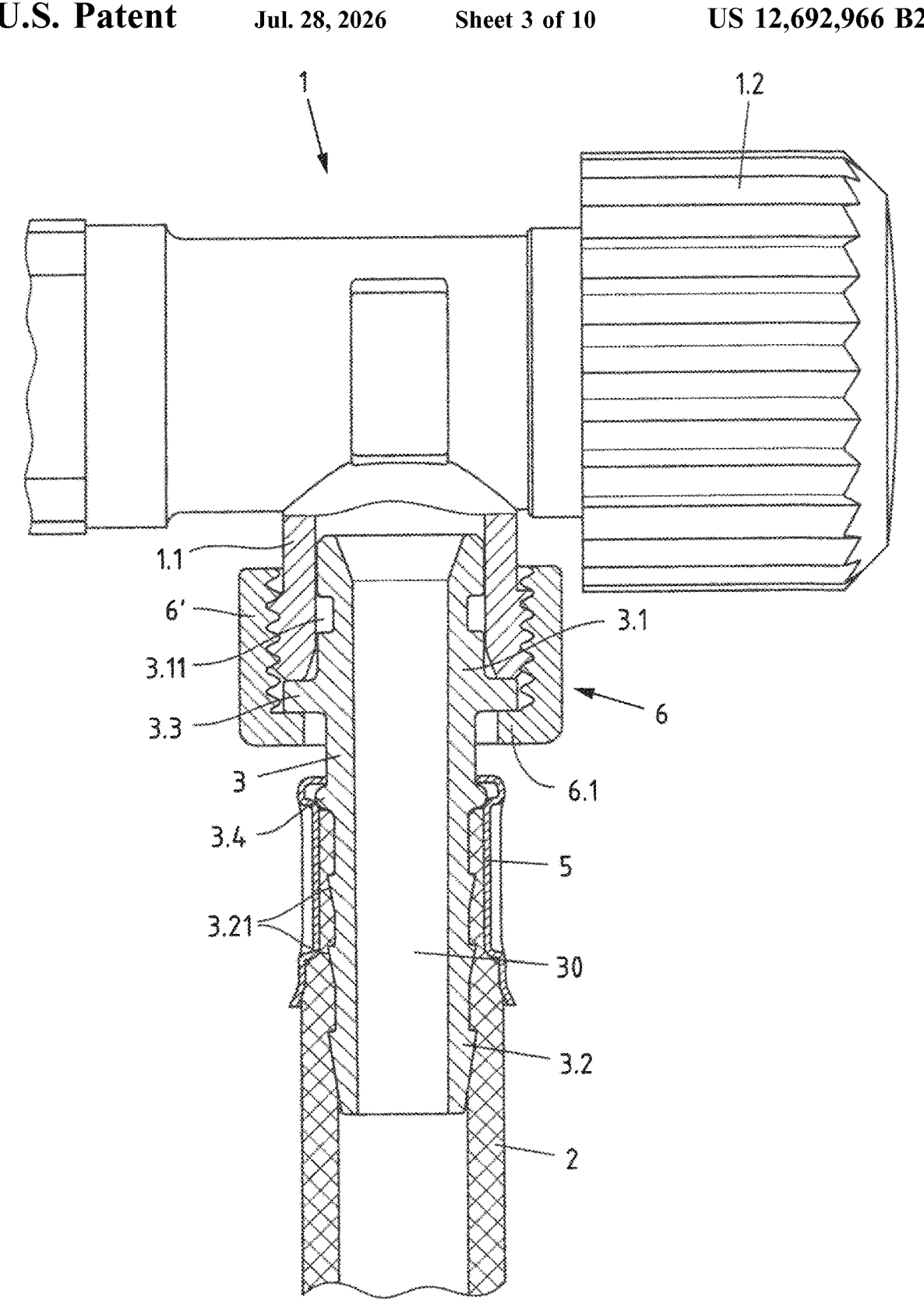
FIG. 1c shows the component according to FIG. 1b, but without the sealing ring.

FIGS. 1a to 1c show a component 1 having a passage, namely a fitting for changing and/or controlling a water flow.

The fitting or component 1 is, for example, an angle valve for a sanitary cistern, e.g. WC cistern. The angle valve has a connection pipe socket 1.1 for a water pipe 2. The water line 2 is, for example, a hose line, preferably an armored hose. A rotary handle of the angle valve is marked 1.2.

To connect the water pipe 2 to the angle valve, a connecting piece 3 is provided, which has a through channel 30 for the passage of water in the direction of the angle valve. The connecting piece 3 comprises a first end 3.1 to be connected to the angle valve or its connection pipe socket 1.1, a second end 3.2 to be connected to the water pipe 2 and an outwardly projecting stop 3.3 in the form of a collar or flange formed between the first end 3.1 and the second end 3.2. The first end 3.1 of the connecting piece is inserted into the connection pipe socket 1.1 of the fitting or component 1. The connecting piece 3 can also be referred to as a connection nipple. It is usually made of plastic.

The first end 3.1 of the connecting piece 3, which can be inserted into the connection pipe socket 1.1 of the fitting or component, is provided on its outer side with an annular groove 3.11 for receiving a sealing ring (e.g. a so-called O-ring) 4. In other known devices for connecting a water line 2, in particular a hose line, to a fitting or a component 1, the first end of the connecting piece is designed as a socket (spout), whereby a flat sealing ring is usually arranged on the socket (spout).

The water line (hose line) 2 is pushed or slipped onto the second end 3.2 of the nipple-shaped connecting piece 3 and connected to the connection piece 3 in a force-fit and watertight manner by means of a plastically deformable crimp sleeve 5. The end 3.2 of the connecting piece connected to the water pipe 2 can also be referred to as a hose nozzle or hose nipple. As is known per se, this end 3.2 of the connecting piece has a saw-tooth profile 3.21 on its outside, which, after plastic compression of the crimp sleeve 5, also creates a positive connection between the connecting piece 3 and the deformable hose line.

Furthermore, devices known from the prior art of the type shown in FIGS. 1a to 1c comprise a fastening element 6 for fastening the connecting piece 3 to the fitting or the component 1, wherein at least one projection 6.1 engaging behind the stop (collar or flange) 3.3 is formed on the fastening element. The projection 6.1 is preferably designed as a circumferential, radially inwardly directed projection. The stop 3.3 defines a stop surface 3.31, which interacts with a seating surface 1.11 of the component 1 when the connecting piece 3 is fastened to the component 1 by defining a position of the connecting piece 3 relative to the component 1.

In the examples shown here, the fastening element 6 is designed as a union nut 6'. Accordingly, the connection pipe socket 1.1 of the fitting or component 1 has an external thread 1.12 that matches the internal thread 6.2 of the union nut. In FIG. 1a, the union nut 6' is merely indicated by dashed edge lines. For example, the union nut 6' has an essentially circular cylindrical circumferential surface with a knurled surface.

The end 3.2 of the connecting piece 3 to be connected to the water pipe 2 has a radial projection 3.4 axially spaced from the stop 3 between the saw-tooth profile 3.21 and the stop 3 in the form of a collar or flange, which is engaged behind by the union nut 6'. The projection 3.4 serves as an axial stop for the water pipe 2 pushed onto the connecting piece 3 and/or as a positive locking element for axially fixing the plastically deformed crimp sleeve 5. The projection 3.4 is preferably designed as a circumferential projection, for example in the form of a circumferential rib.

As shown in FIGS. 1*a* and 1*b*, the connecting piece 3 connected to the water pipe 2 is inserted together with the sealing ring (O-ring) 4 into the connection pipe socket 1.1 of the fitting or component 1. The union nut 6' is screwed onto the external thread 1.12 of the connection pipe socket 1.1 and tightened. The union nut 6' thus prevents the connecting piece 3 from being pressed out of the connection pipe socket 1.1, for example by the water pressure prevailing in the connection pipe socket 1.1. For this purpose, the circumferential collar on the connecting piece 3 is designed as a stop (3.3).

In practice, it has been found that in some installation cases, connection devices as shown in FIGS. 1*a* and 1*b* have been installed without an O-ring or with a damaged O-ring 4. The installers have sometimes tightened the union nut 6' very tightly so that the collar (stop 3.3) of the plastic connecting piece 3 could seal briefly on the seating surface (end face) 1.11 of the connection piece 1.1 of the brass fitting or component 1. However, such a connection without an O-ring, as shown in FIG. 1*c*, is not permanently watertight. It was found that water dripped or even splashed from the connection made without an O-ring 4 after some time. These faulty connections have caused water damage in buildings.

In FIGS. 2*a* to 7 several embodiments of the device according to the invention are shown, each of which is characterized by the fact that the stop 3.3 designed as a collar or flange or the seating surface 1.11 facing the stop 3.3 of the fitting or of the component 1 having a passage has at least one recess 3.32, 3.33, 3.34 or 1.111 or at least one projection (elevation) 3.35 or 1.112, by means of which an annularly closed surface contact between the stop surface 3.31 of the stop 3.3 and the seat surface 1.11 is interrupted or prevented. This ensures that the connection between the connecting piece 3 and the sanitary fitting 1 is immediately and permanently leaking if the sealing ring is missing or damaged, for example in the form of a flat sealing ring (annular washer seal) or O-ring 4, so that the permanent leakage and thus the absence or damage of the sealing ring is immediately or as early as possible noticeable when the fitting or component 1 is put into operation due to the immediate escape of leakage water.

Figure 2A:
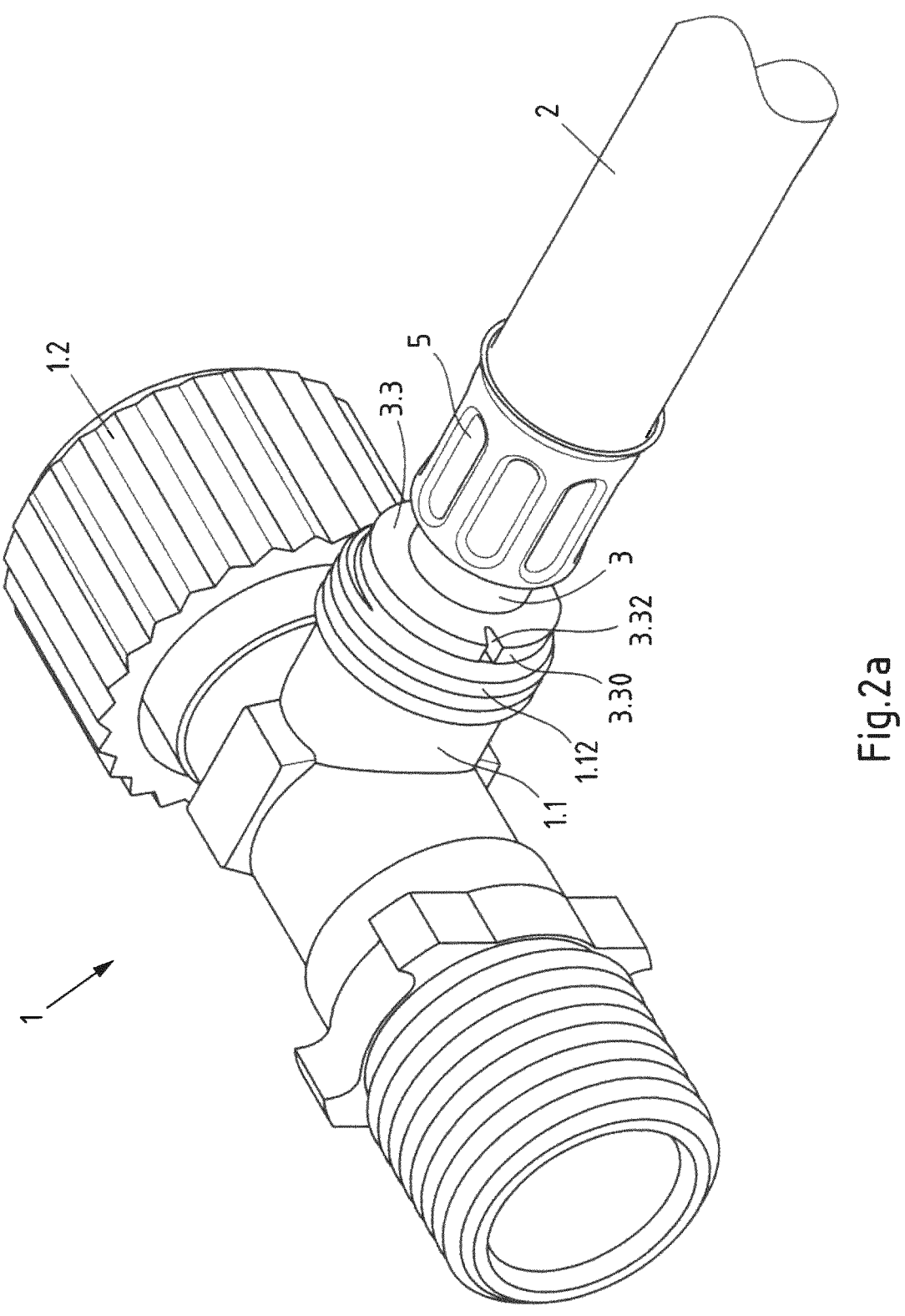
FIG. 2a shows a component (angle valve) according to FIG. 1a with a water pipe connected to it using a connecting piece according to the invention, in a perspective view.
Figure 2B:
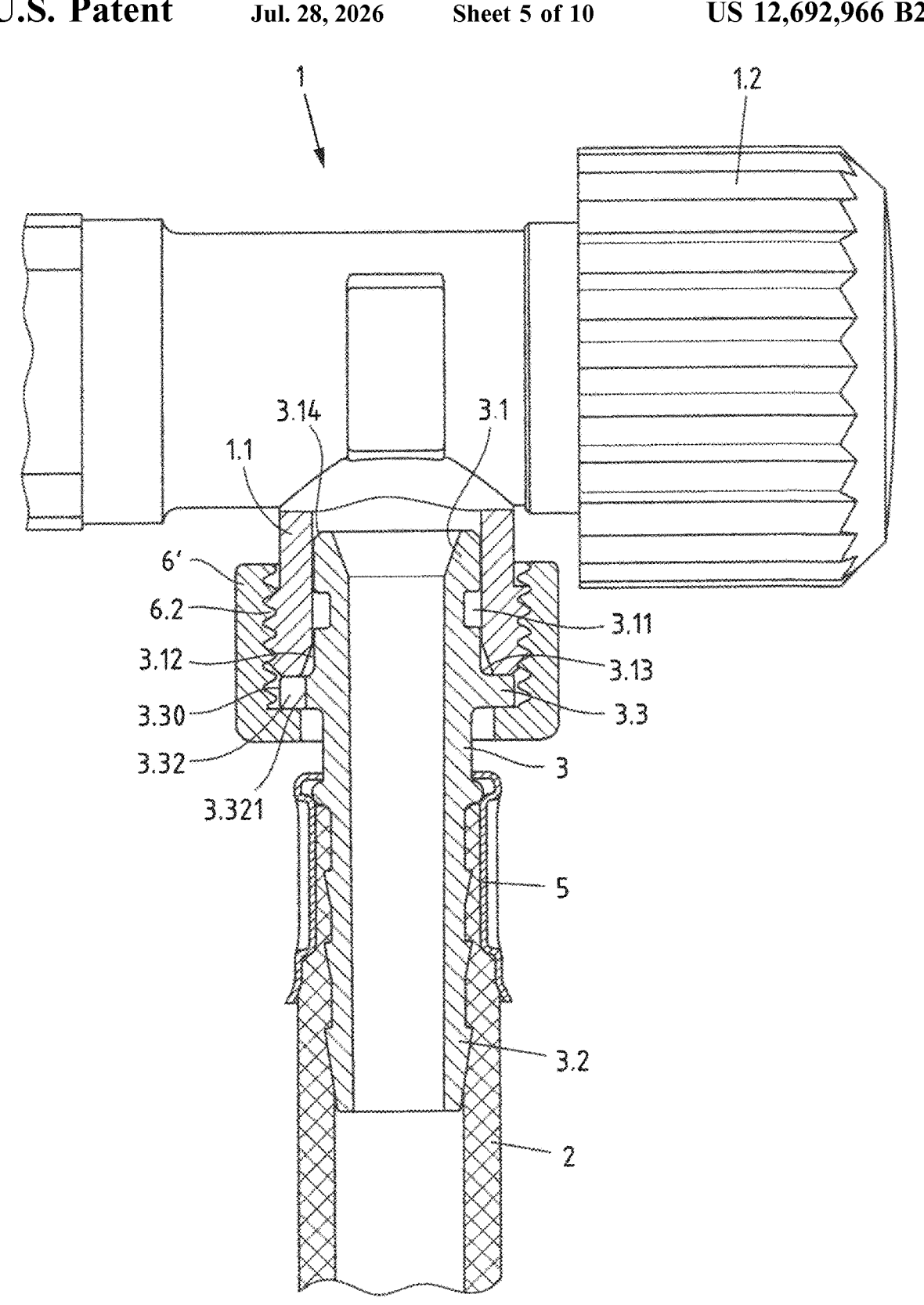
FIG. 2b shows the component from FIG. 2a with the water pipe connected to it using the connecting piece according to the invention, without sealing ring, in a partial axial sectional view.

FIG. 2*a* and FIG. 2*b* show a first embodiment of the invention. For the sake of clarity, the union nut 6' is not shown in FIG. 2*a*; however, it is shown in FIG. 2*b* in a partial axial sectional view. In this embodiment, a recess 3.32 in the form of a gap is formed in the stop 3.3, which is designed as a collar or flange. Starting from the outer edge 3.30 of the stop 3.3, the gap 3.32 extends radially in the direction of the circumferential outer surface 3.12 of the end 3.1 of the connecting piece 3 inserted into the connection pipe socket 1.1 of the fitting or component (angle valve) 1, with the gap 3.32 ending at a radial distance from the outer surface 3.12. The outer surface 3.12 defines a fillet 3.13 with the stop 3.3, wherein the radial distance of the gap 3.32 from the outer surface 3.12 is less than 3 mm, preferably less than 2 mm, particularly preferably less than 1 mm. However, it is also within the scope of the invention to form the gap 3.32 so deep that it ends directly, i.e. without distance, at the outer surface 3.12.

The nipple-shaped connecting piece 3 has a circumferential chamfer 3.14 on the outer circumference of its end to be inserted. The connection pipe socket 1.1 of the fitting or component 1 associated with the connecting piece 3 opens at the seating surface 1.11 facing the stop 3.3, whereby the receptacle defined by the connection pipe socket 1.1 has an essentially circular-cylindrical inner section into which the essentially circular-cylindrical axial section (plug-in nipple)

of the connecting piece 3 with the annular groove 3.11 for the sealing ring is received. The circular cylindrical inner section of the connection pipe socket 1.1 is adjoined by a conically increasing orifice section 1.13 in the direction of the seating surface 1.11. FIG. 2*b* shows that the gap (recess 3.32) formed in the collar (stop 3.3) partially overlaps with the mouth section 1.13 of the connection pipe socket 1.1, so that an annular closed surface contact between the stop surface 3.31 of the collar and the seating surface 1.11 of the connection pipe socket 1.1 is interrupted.

FIG. 2*a* shows that the gap (recess 3.32) extends over the entire axial thickness of the stop 3.3. The gap has a V-shaped or U-shaped cross-sectional profile, for example. Furthermore, the gap can have a flattened gap base. The gap can also be significantly wider in the circumferential direction of the stop 3.3, which is designed as a collar, than shown in FIG. 2*a*. For example, the width of the gap measured in the circumferential direction of the collar at the gap base 3.321, i.e. at the deepest point of the gap, can be in the range of 2 mm to 6 mm. Larger gap widths are also possible.

Figure 3:
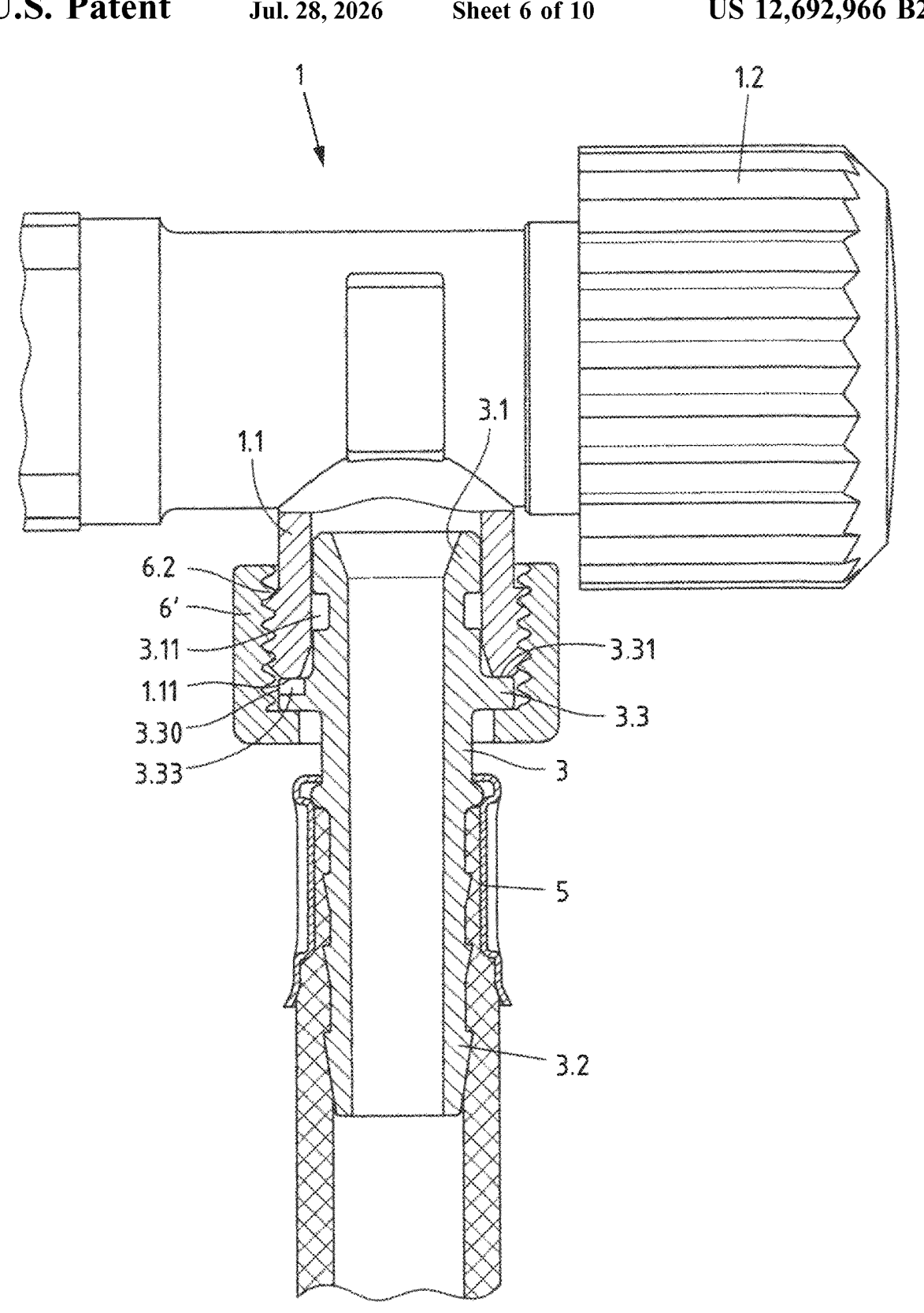
FIG. 3 is a partial axial sectional view of the component shown in FIG. 2b with a water pipe connected thereto using a connecting piece according to the invention designed in accordance with a second embodiment.

The embodiment of the invention shown in FIG. 3 differs from the embodiment shown in FIGS. 2*a* and 2*b* in that the at least one gap or the at least one recess 3.33 does not extend over the entire axial thickness of the stop 3.3. In the embodiment shown in FIG. 3, the at least one recess 3.33 is in the form of a groove in the stop surface 3.31 of the stop 3.3 facing the seating surface 1.11 of the fitting or the component. The groove (recess 3.33) extends inwards from the outer circumference 3.30 of the stop 3.3, which is designed as a collar, whereby the groove ends at a radial distance from the outer surface 3.12 of the insertion section of the nipple-shaped connecting piece 3. The outer surface 3.12 in turn defines a fillet 3.13 with the stop 3.3, wherein the radial distance of the groove from the outer surface 3.12 is less than 3 mm, preferably less than 2 mm, particularly preferably less than 1 mm. However, it is also within the scope of the invention to form the inner end of the groove (recess 3.33) so deep that it ends directly, i.e. without distance, at the outer surface 3.12.

Figure 4:
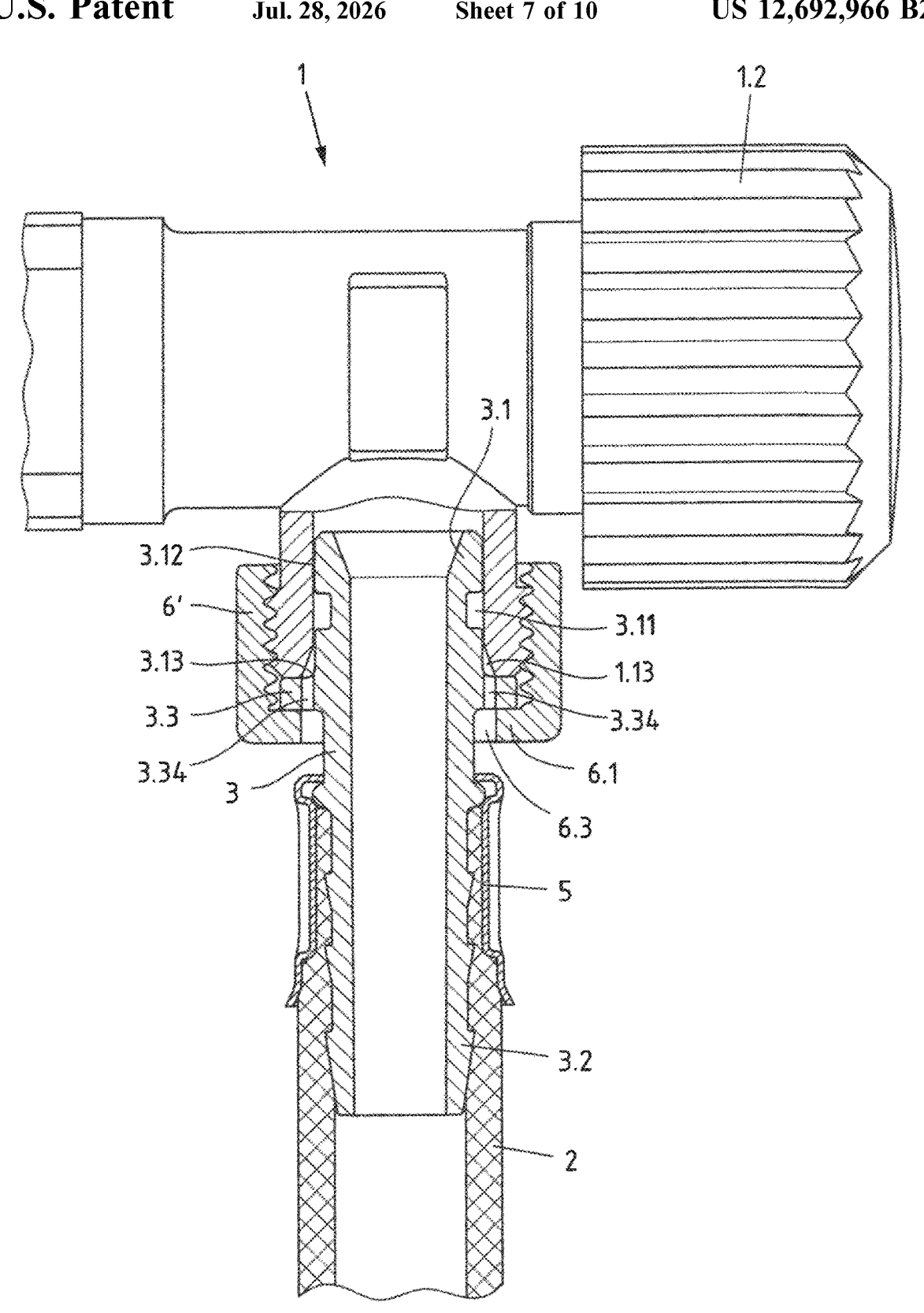
FIG. 4 shows the component (angle valve) according to FIG. 2b with a water pipe connected thereto using a connecting piece according to the invention designed according to a third embodiment, in a partial axial sectional view.

FIG. 4 shows a third embodiment example of the invention. This example differs from the examples shown in FIGS. 2*a*, 2*b* and 3 in that the at least one recess 3.34 in the stop (collar) 3.3 is formed in the form of a through hole which extends over the entire axial thickness of the stop 3.3. Two such recesses 3.34 can be seen in FIG. 4. The two through holes (recesses 3.34) are, for example, in the form of bores and are arranged in the collar (3.3) at a distance of approx. 180° from each other.

The through hole (3.34) can adjoin the circumferential outer surface 3.12 of the first end 3.1 of the connecting piece 3 directly or at a radial distance, whereby this outer surface 3.12 defines with the collar a fillet 3.13 lying next to the through hole. In the example shown in FIG. 4, the through hole (3.34) is almost directly adjacent to the circumferential outer surface 3.12 of the first end 3.1 of the connecting piece 3. The through hole (3.34) is aligned with the conically increasing mouth section 1.13 of the connection pipe socket 1.1 and with the rear opening 6.3 of the union nut 6', which is limited by the circumferential projection (web) of the union nut 6'.

Figure 5:
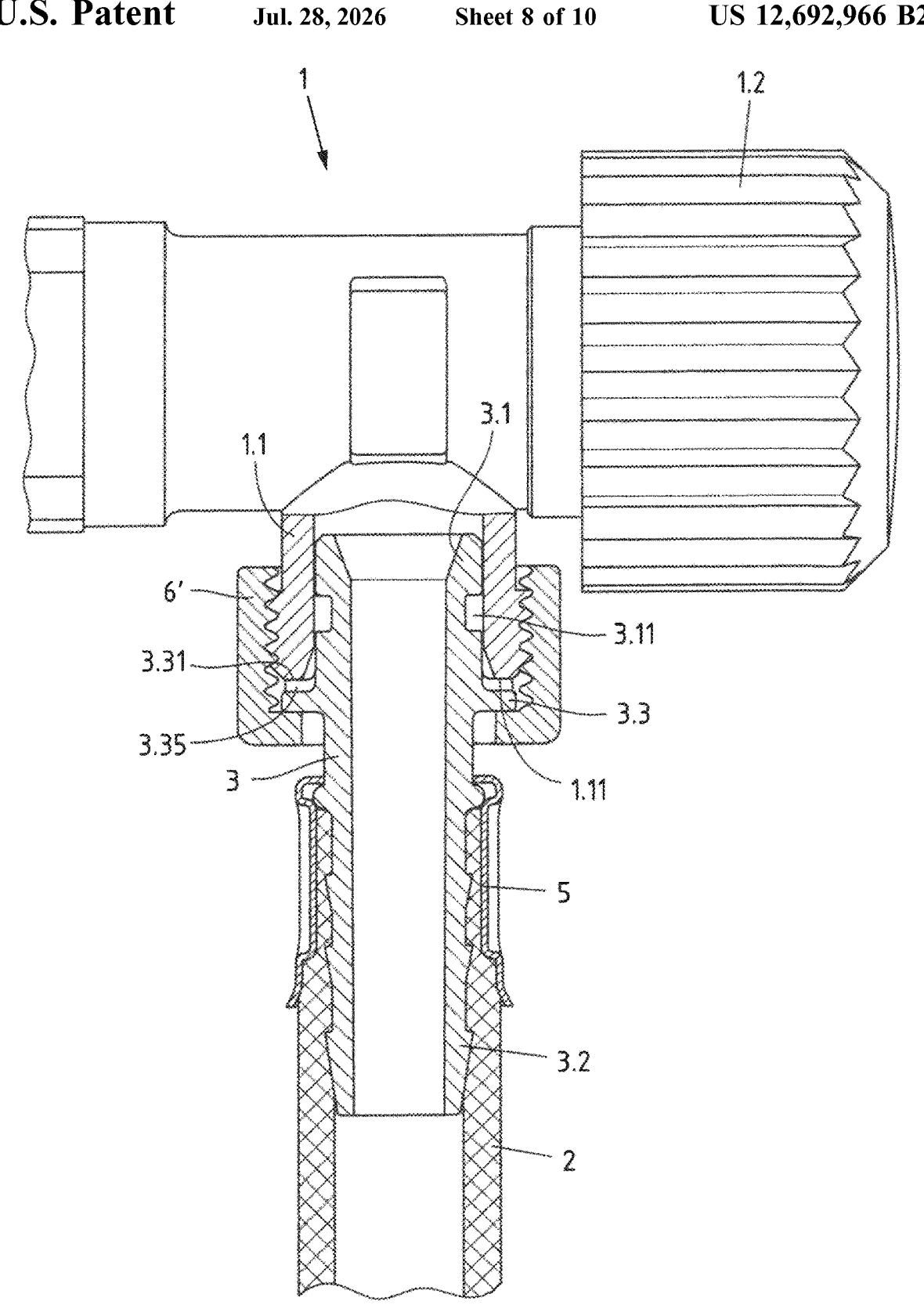
FIG. 5 is a partial axial sectional view of the component according to FIG. 2b with a water pipe connected thereto using a connecting piece according to the invention designed according to a fourth embodiment.

FIG. 5 shows a fourth embodiment example of the invention. This example differs from the examples shown in FIGS. 2*a*, 2*b*, 3 and 4 in that the stop 3.3 designed as a collar has at least one projection (elevation) 3.35, by means of which an annularly closed surface contact between the stop surface 3.31 of the stop 3.3 and the seating surface 1.11 of the connection pipe socket 1.1 of the fitting or the component 1 is interrupted or prevented. The at least one projection 3.35 is formed on the stop surface 3.31 of the stop 3.3 facing the fitting or the component 1. The projection (elevation) 3.35 is designed, for example, in the form of at least one rib or thickening. Preferably, the projection 3.35 is elongated and extends radially on the circumferential stop 3.3.

FIG. 5 shows two such projections (elevations) 3.35. The two projections 3.35 are designed, for example, in the form of ribs extending radially on the collar (3.3), which are spaced apart from each other by approx. 180° on the collar (3.3). Leaking water, which escapes from the plug-in seat due to a missing O-ring in the annular groove 3.11, flows along the ribs (3.35) to the internal thread 6.2 of the union nut 6' and through the thread along the external thread 1.12 of the connection pipe socket 1.1 to the outside, where it can be perceived when the fitting or component 1 is put into operation.

Figure 6:
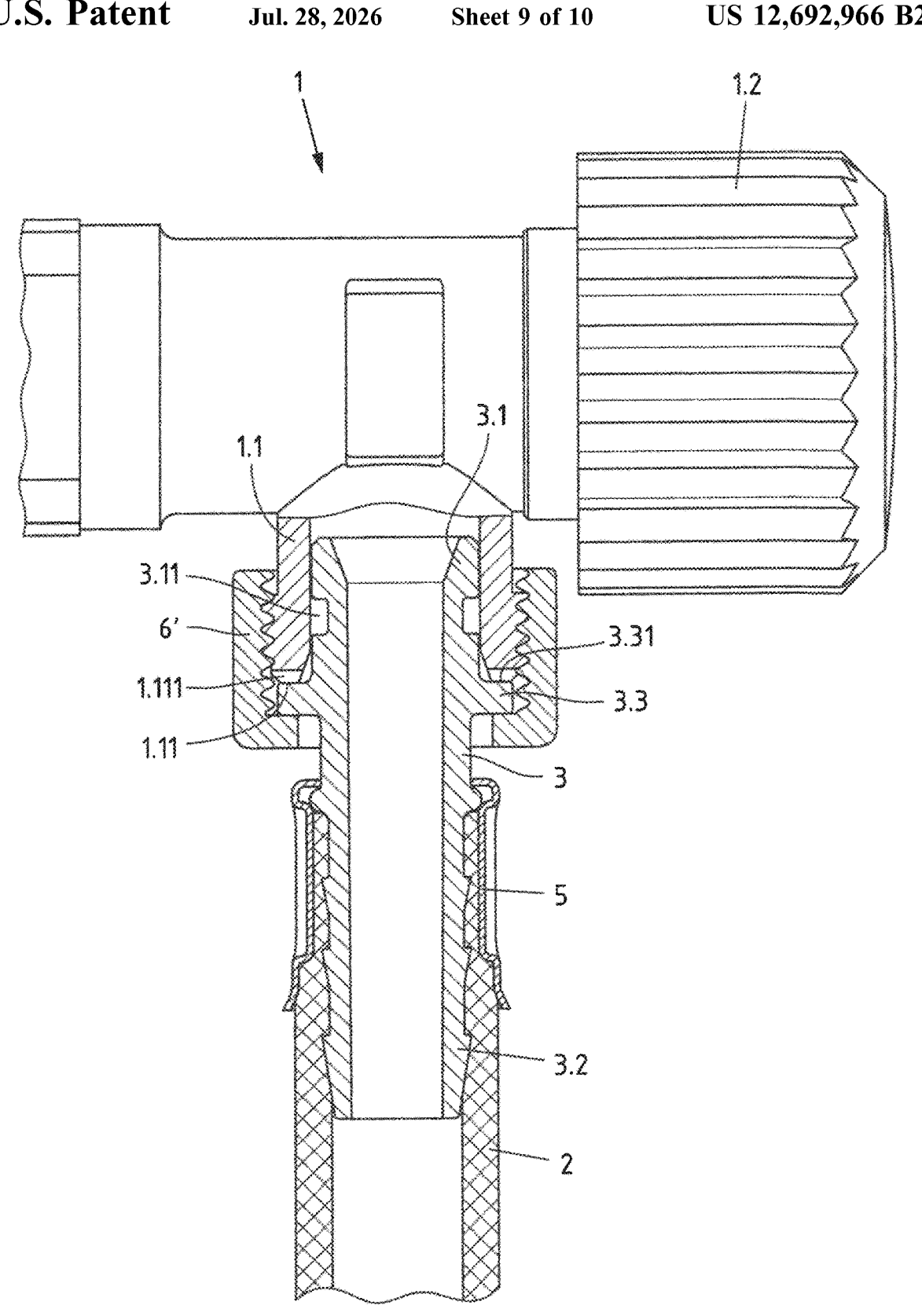
FIG. 6 shows a component according to a fifth embodiment according to the invention, e.g. an angle valve, with a water pipe connected thereto using a conventional connecting piece, in a partial axial sectional view.

FIG. 6 shows a fifth embodiment example of the invention. This example differs from the examples shown in FIGS. 2a, 2b, 3, 4 and 5 in that the seating surface 1.11 of the connection pipe socket 1.1 of the fitting or component 1 facing the stop 3.3 has at least one recess 1.111, by means of which an annularly closed surface contact between the stop surface 3.31 of the stop 3.3 and the seating surface 1.11 of the connection pipe socket 1.1 is interrupted or prevented. The at least one recess 1.111 is formed in the seating surface 1.11, which faces the stop surface 3.31 of the stop 3.3 designed as a collar.

Two such recesses 1.111 can be seen in FIG. 6. The recesses 1.111 are designed, for example, in the form of grooves that extend radially in the seating surface 1.11 of the connection pipe socket 1.1 and are spaced apart, for example, by approximately 180°.

Figure 7:
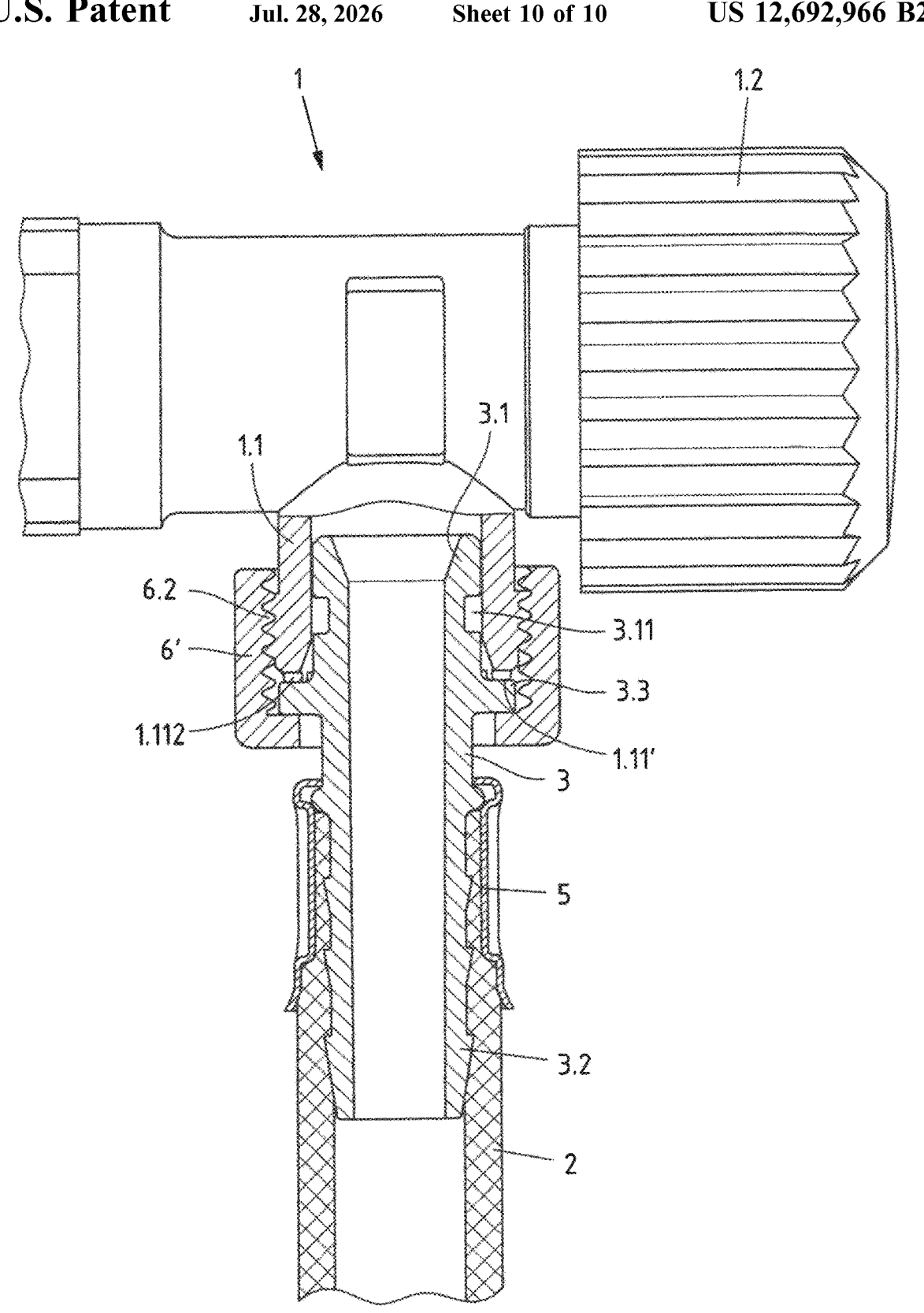
FIG. 7 is a partial axial sectional view of a component designed according to a sixth embodiment according to the invention, e.g. angle valve, with a water pipe connected thereto using a conventional connecting piece.

FIG. 7 shows a sixth embodiment example of the invention. This example differs from the examples shown in FIGS. 2a, 2b and 3 to 6 in that the seating surface side 1.11' of the connection pipe socket 1.1 of the fitting or component 1 facing the stop (collar) 3.3 has at least one projection (elevation) 1.112, by means of which an annularly closed surface contact between the stop surface 3.31 of the stop 3.1 and the seating surface of the connection pipe socket 1.1 is interrupted or prevented.

FIG. 7 shows two such projections (elevations) 1.112. The projections 1.112 are designed, for example, in the form of crenellated or tooth-shaped projections that protrude axially on the end face of the connection pipe socket 1.1.

The invention claimed is:

1. A device for connecting a water pipe to a component having a passage, the device comprising:

a connecting piece having a passage channel for the passage of water in the direction of the component, wherein the connecting piece has a first end to be connected to the component, a second end to be connected to the water pipe and an outwardly projecting stop in the form of a collar or flange formed between the first end and the second end, wherein the first end of the connecting piece is provided on its outer side with an annular groove or is formed as a socket for receiving a sealing ring, wherein a sealing ring is arranged in the annular groove or on the socket, and a fastening element for fastening the connecting piece to the component, at least one projection engaging behind the stop being formed on the fastening element, the stop defining a stop surface which, when the connecting piece is fastened to the component, interacts with a seating surface of the component by defining a position of the connecting piece relative to the component, wherein the stop has at least one recess, by means of which an annularly closed surface contact between the stop surface of the stop and the seating surface of the component is interrupted or prevented, the at least one recess being formed in the form of a gap which extends from an outer edge of the stop to a circumferential outer surface of the first end of the connecting piece or ends at a radial distance from this outer surface, wherein the gap extends over the entire axial thickness of the stop.

2. The device according to claim 1, wherein the outer surface defines a fillet with the stop, and wherein the radial distance is less than 3 mm.

3. The device according to claim 2, wherein the gap has a V-shaped or U-shaped cross-sectional profile and/or a flattened gap base.

4. The device according to claim 1, wherein the first end of the connecting piece is designed as a plug-in nipple.

5. The device according to claim 1, wherein the fastening element is designed as a union nut.

6. The device according to claim 1, wherein the second end of the connecting piece is connected to a water pipe in the form of a hose.

7. The device according to claim 1, wherein the component is a fitting for changing and/or controlling a water flow for a cistern, wherein the seating surface of the component is formed on the end face of a plug-in seat for receiving the connecting piece.

* * * * *